(12) United States Patent
Seki et al.

(10) Patent No.: US 7,790,645 B2
(45) Date of Patent: Sep. 7, 2010

(54) DIELECTRIC CERAMIC COMPOSITION AND AN ELECTRIC DEVICE

(75) Inventors: Hideaki Seki, Abiko (JP); Sanshiro Aman, Yurihonjo (JP); Mari Miyauchi, Narita (JP)

(73) Assignee: TDK Corporation, Tokyo (JP)

( * ) Notice: Subject to any disclaimer, the term of this patent is extended or adjusted under 35 U.S.C. 154(b) by 131 days.

(21) Appl. No.: 12/232,875

(22) Filed: Sep. 25, 2008

(65) Prior Publication Data

US 2009/0088315 A1   Apr. 2, 2009

(30) Foreign Application Priority Data

Sep. 28, 2007   (JP) .............................. 2007-255598

(51) Int. Cl.
C04B 35/49 (2006.01)
H01G 4/06 (2006.01)

(52) U.S. Cl. .................. 501/139; 361/321.4; 361/321.5

(58) Field of Classification Search ................. 501/139; 361/321.4, 321.5
See application file for complete search history.

(56) References Cited

U.S. PATENT DOCUMENTS

| | | | |
|---|---|---|---|
| 3,969,252 A * | 7/1976 | Utsumi et al. | 501/137 |
| 6,620,755 B2 * | 9/2003 | Saito et al. | 501/138 |
| 6,710,000 B2 | 3/2004 | Kawamoto et al. | |
| 6,960,547 B2 * | 11/2005 | Matoba et al. | 501/139 |
| 7,008,894 B2 * | 3/2006 | Sasaki et al. | 501/138 |
| 7,580,242 B2 * | 8/2009 | Aman et al. | 361/321.5 |
| 2007/0254799 A1 * | 11/2007 | Kaneda et al. | 501/139 |
| 2008/0226944 A1 * | 9/2008 | Aman et al. | 428/697 |
| 2009/0149312 A1 * | 6/2009 | Aman et al. | 501/137 |

FOREIGN PATENT DOCUMENTS

| | | | |
|---|---|---|---|
| JP | B2-3139444 | | 2/2001 |
| JP | A-2002-265265 | | 9/2002 |
| JP | A-2002-293627 | | 10/2002 |
| JP | B2-3567759 | | 9/2004 |
| JP | 2005067941 | * | 3/2005 |
| JP | 2009143735 | * | 7/2009 |

* cited by examiner

Primary Examiner—Karl E Group
(74) Attorney, Agent, or Firm—Oliff & Berridge, PLC

(57) ABSTRACT

The present invention relates to a dielectric ceramic composition comprising $BaTiO_3$, $BaZrO_3$, and the oxide of R wherein, when A is the content of $BaZrO_3$, and C is the content of the oxide R, with respect to 100 moles of $BaTiO_3$, then A is $40 \leq A \leq 65$ moles and C is $4 \leq C \leq 15$ moles; plus said dielectric composition satisfies the equation (1) and (2). The present invention can provide a dielectric ceramic composition good in IR lifetime, and capable to be suitably used for medium-high voltage which has a high rated voltage (for example, 100V or more).

$$0.0038A - 0.147 \leq B \leq 0.004A + 0.04 \quad \text{Equation (1)}$$

(note that, B is a ratio of the X-ray diffraction maximum intensity among peaks of said $BaZrO_3$ with respect to the X-ray diffraction maximum intensity among peaks of said $BaTiO_3$).

$$0.0041C - 0.0115 \leq D \leq 0.0046C + 0.084 \quad \text{Equation (2)}$$

(note that, D is a ratio of the X-ray diffraction maximum intensity among peaks of the oxide of said R with respect to the X-ray diffraction maximum intensity among peaks of said $BaTiO_3$).

4 Claims, 3 Drawing Sheets

The relation between the maximum intensity ratio of ($BaZrO_3$/$BaTiO_3$) and the content of $BaZrO_3$ BaTiO$_3$:BaZrO$_3$:Gd$_2$O$_3$=1:0.08:0.03

The relation between the maximum intensity ratio of $(BaZrO_3/BaTiO_3)$ and the content of $BaZrO_3$ A: The content of $BaZrO_3$ [mol%]

B: The maximum intensity ratio of $(BaZrO_3/BaTiO_3)$ [-]

$B = 0.004A + 0.04$
$B = 0.0038A - 0.147$

The relation between the maximum intensity of $(Gd_2O_3/BaTiO_3)$ and the content of $Gd_2O_3$ C: The content of $Gd_2O_3$ [mol%]

D: The maximum intensity ratio of $(Gd_2O_3/BaTiO_3)$ [-]

$D = 0.0046C + 0.084$
$D = 0.0041C - 0.0115$

DIELECTRIC CERAMIC COMPOSITION AND AN ELECTRIC DEVICE

BACKGROUND OF THE INVENTION

1. Field of the Invention

The present invention relates to a dielectric ceramic composition having a reduction resistance, and an electric device comprising said dielectric ceramic composition in dielectric layer. Further specifically, the present invention relates to the dielectric ceramic composition and the electronic device suitable for the medium-high voltage application used at a high rated voltage (for example, 100 V or more).

2. Description of the Related Art

A multilayer ceramic capacitor as an example of the electronic device is produced, for example, by alternately stacking a ceramic green sheet comprised of a predetermined dielectric ceramic composition and an internal electrode layer having a predetermined pattern, then co-firing the green chip thus obtained as one body. Since internal electrode layers of the multilayer ceramic capacitor are formed to be one body with ceramic dielectric by firing, materials not reacting with the ceramic dielectric has to be selected. Therefore, in the related art, it has been necessary to use expensive precious metals, such as platinum and palladium, as the material composing the internal electrode layer.

In recent years, however, dielectric ceramic composition using inexpensive base metals, such as nickel and copper, have been developed and a drastic reduction of costs has been realized.

On the other hand, demands for downsizing of electronic devices have increased along with electronic circuits to have higher in density, and multilayer ceramic capacitors have rapidly become downsized with a larger capacity. Along with that, each layer of the dielectric layer of the multilayer ceramic capacitor has become thinner, thus there are demands for the dielectric ceramic composition which can maintain the reliability as a capacitor even when it is made thinner. Especially for the capacitor for the medium-high voltage application used at a high rated voltage (for example, at 100 V or more), extremely high reliability is demanded for the dielectric ceramic composition constituting the dielectric layer.

In response to this demand, for example, the Japanese Published Patent No. 3567759 discloses a dielectric ceramic compositions for the capacitor used under high frequency/high voltage comprised of; main component expressed by composition formula: $ABO_3+aR+bM$ (note that, $ABO_3$ is a solid solution of barium titanate type, an oxide of R (a metal element such as La), and an oxide of M (a metal element such as Mn), and the subcomponent comprising a sintering aid comprised of at least one from B element and Si element. Moreover, this Japanese Published Patent No. 3567759 describes the addition of $XZrO_3$ (note that, X is a at least one metal element selected from Ba, Sr, and Ca) as an additive component of the main component in the range of 0.35 mole or less with respect to 1 mole of solid solution of barium titanate expressed by $ABO_3$ of the main component.

Also, the Japanese published Patent No. 3139444 discloses to calcinate the starting material of $BaTiO_3$ and $BaZrO_3$ so that ratio of X-ray diffraction maximum intensity of $BaTiO_3$ becomes 5 or less with respect to ratio of X-ray diffraction maximum intensity of $BaZrO_3$ as for the production method of the dielectric ceramic compositions which has superior reduction resistance and improved specific permittivity.

However, Japanese published Patent No. 3567759 had a problem that the voltage resistance (the breakdown voltage) was low and the lifetime characteristics (the accelerated lifetime of the insulation resistance) was insufficient, thus had less reliability. Since, such problem became prominent especially when the multilayer ceramic capacitor was downsized and the capacity was enlarged, the improvement of the voltage resistance and the lifetime characteristics (the accelerated lifetime of the insulation resistance) were demanded in order to achieve down sizing and the capacity enlargement. Note that, Japanese published Patent No. 3139444 has no description of the lifetime characteristics of the produced multilayer ceramic capacitor, and it did not solve such problem.

SUMMARY OF THE INVENTION

The present invention was achieved reflecting such situations, and the object is to provide a dielectric ceramic composition capable of firing in a reduced atmosphere, low in the electrostriction when applying the voltage, and capable to improve the accelerated lifetime of the insulation resistance (high temperature accelerated lifetime) while maintaining the specific permittivity, the DC bias characteristics, the voltage resistance (the breakdown voltage) and the capacitance-temperature characteristics in good condition; and the electronic device comprising this dielectric ceramic composition as the dielectric layer.

As a result of keen examination, the present inventors has found that when the X-ray maximum intensity peak of the specific component has specific relation with respect to the content of said component, the high temperature accelerated lifetime (HALT) can be improved while maintaining the specific permittivity, the capacitance-temperature characteristics and other characteristics in good condition, and thus the present invention was achieved.

That is, a dielectric ceramic composition of the present invention comprises;

$Ba_mTiO_{2+m}$ (note that, m is $0.99 \leq m \leq 1.01$), $Ba_nZrO_{2+n}$ (note that, n is $0.99 \leq n \leq 1.01$), and an oxide of R (note that, R is at least one element selected from Sc, Y, La, Ce, Pr, Nd, Pm, Sm, Eu, Gd, Tb, Dy, Ho, Er, Tm, Yb, and Lu); wherein when A is the content of said $Ba_nZrO_{2+n}$ with respect to 100 moles of said $Ba_mTiO_{2+m}$, and C is the content of the oxide of said R with respect to 100 moles of said $Ba_mTiO_{2+m}$, said A is $40 \leq A \leq 65$ moles as calculated in conversion of $Ba_nZrO_{2+n}$, said C is $4 \leq C \leq 15$ moles as calculated in conversion of $R_2O_3$; and the following equations (1) and (2) are satisfied.

$$0.0038A - 0.147 \leq B \leq 0.004A + 0.04 \quad \text{Equation (1)}$$

(note that, B is a ratio of the X-ray diffraction maximum intensity among peaks of said $Ba_nZrO_{2+n}$ with respect to the X-ray diffraction maximum intensity among peaks of said $Ba_mTiO_{2+m}$).

$$0.0041C - 0.0115 \leq D \leq 0.0046C + 0.084 \quad \text{Equation (2)}$$

(note that, D is a ratio of the X-ray diffraction maximum intensity among peaks of the oxide of said R with respect to the X-ray diffraction maximum intensity among peaks of said $Ba_mTiO_{2+m}$).

The dielectric ceramic composition of the present invention comprises $Ba_mTiO_{2+m}$, $Ba_nZrO_{2+n}$ and the oxide of R; and $Ba_nZrO_{2+n}$ and the oxide of the R are assumably solid soluble in $Ba_mTiO_{2+m}$. When all of $Ba_nZrO_{2+n}$ and the oxide of the rare earth element are solid solubilized in $Ba_mTiO_{2+m}$, the X-ray diffraction peaks of this dielectric ceramic composition only show the peaks of $Ba_mTiO_{2+m}$. However, when $Ba_nZrO_{2+n}$ and the oxide of the rare earth element are beyond the limit to solid solubilize in $Ba_mTiO_{2+m}$, then not only the X-ray diffraction peaks of $Ba_mTiO_{2+m}$ but also the X-ray diffraction peaks of the $Ba_nZrO_{2+n}$ and the oxide of the rare earth element which were solid insoluble are detected. That is, the X-ray diffraction maximum intensity among peaks of $Ba_nZrO_{2+n}$ with respect to that of $Ba_mTiO_{2+m}$ (B) is an indication of a degree of solid solution of $Ba_nZrO_{2+n}$ in $Ba_mTiO_{2+m}$; and the X-ray diffraction maximum intensity among peaks of the oxide of R with respect to that of $Ba_mTiO_{2+m}$ (D) is an indication of a degree of solid solution of the oxide of R in $Ba_mTiO_{2+m}$. In the present invention, by setting B and D within above stated range; that is, by making solid insoluble $Ba_nZrO_{2+n}$ and the oxide of R exist in the dielectric ceramic composition within above stated range, the high temperature accelerated lifetime can be especially improved.

Preferably, said dielectric ceramic material further comprises an oxide of Mg, an oxide of at least one selected from Mn, Cr, Co, and Fe; and an oxide of at least one selected from Si, Li, Al, Ge and B; wherein the ratios as calculated in the conversion of the oxide or the composite oxide of each component with respect to 100 moles of $Ba_mTiO_{2+m}$ are;

the oxide of Mg: 4 to 12 moles, the oxide of Mn, Cr, Co, and Fe: 0.5 to 3 moles, and the oxide of Si, Li, Al, Ge and B: 3 to 9 moles.

The present invention provides an electronic device comprising an dielectric layer and an internal electrode layer, wherein said dielectric layer is constituted by any one of the above stated dielectric ceramic composition.

An electronic device according to the present invention is not particularly limited, however, a multilayer ceramic capacitor, a piezoelectric element, a chip inductor, chip varistor, a chip thermistor, a chip resistor, a chip type surface mount electronic device (SMD) may be mentioned as examples.

The dielectric ceramic compositions of the present invention allows $Ba_nZrO_{2+n}$ and the oxide of the rare earth element which are beyond the limit to solid solubilize in $Ba_mTiO_{2+m}$ to exist in a solid insoluble state in the dielectric ceramic composition. Furthermore, the maximum intensity ratio and the content of $Ba_nZrO_{2+n}$ and the oxide of the rare earth element satisfy specific relations. As a result, the high temperature accelerated lifetime can be improved while maintaining the characteristics such as the specific permittivity, the voltage resistance (the breakdown voltage), and the capacitance-temperature characteristic in good condition.

Therefore, by applying the dielectric ceramic composition of the present invention to the dielectric layer of the electronic device such as a multilayer ceramic capacitor, for example, it is possible to attain high reliability even when the dielectric layer is made as thin as 20 μm or so, and is used for medium-high voltage application which has a high rated voltage (for example, 100V or more, especially 250V or more). That is, the present invention can provide an electronic device which is downsized and having higher capacity, and moreover it enables to provide an electronic device used at medium-high voltage having higher reliability.

Such electronic device of the present invention can suitably used in, for example, a various automobile related application (an ECM (engine electronic computer module), a fuel injection device, an electronic regulated throttle, an inverter, a converter, a HID lamp, a battery control unit of the hybrid engine or so), or a digital steel camera application.

BRIEF DESCRIPTION OF THE DRAWINGS

The present invention will be explained in the following, based on the embodiment shown in the figures.

DESCRIPTION OF THE PREFERRED EMBODIMENTS

Multilayer Ceramic Capacitor 1

Figure 1:
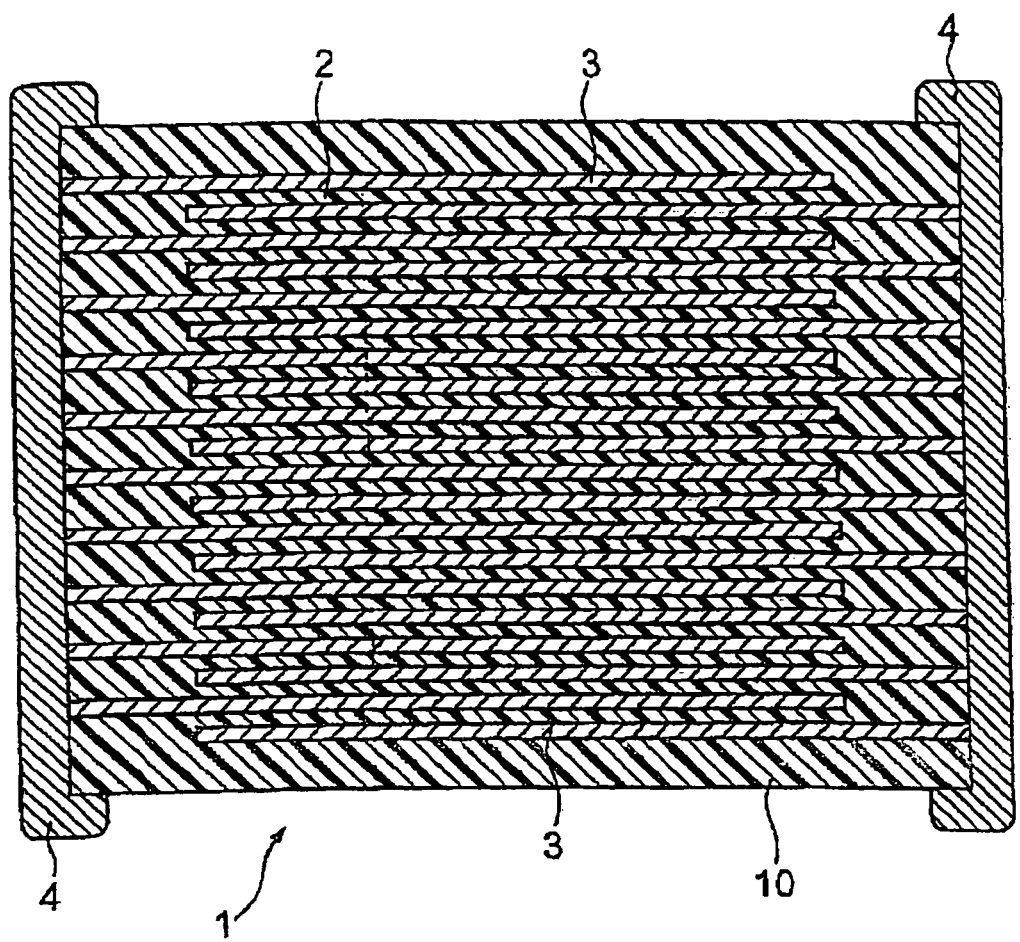
FIG. 1 is a cross section of a multilayer ceramic capacitor according to an embodiment of the present invention.

As shown in FIG. 1, a multilayer ceramic capacitor 1 according to an embodiment of the present invention comprises a capacitor element body 10 in which a dielectric layer 2 and an internal electrode layer 3 are stacked in alternating manner. At the both side ends of this capacitor element body 10, a pair of external electrode 4, which connects with each internal electrode alternately placed in the capacitor element body 10, is formed. Although, the shape of the capacitor element body 10 is not particularly limited, normally, it is in rectangular parallelepiped shape, and the dimension can be suitably changed depending on the use.

The internal electrode layers 3 are stacked so that each end face is alternately exposed to surfaces of the two opposed end portions of the capacitor device body 10. Also, the pair of external electrode 4 is formed at both end portions of the capacitor device body 10, and connected with the exposed end faces of the alternately-stacked internal electrode layers 3 to form a capacitor circuit.

Dielectric Layer 2

The dielectric layer 2 comprises a dielectric ceramic composition of the present invention. The dielectric ceramic composition of the present invention at least comprises;

$Ba_mTiO_{2+m}$ (note that, m is $0.99 \leq m \leq 1.01$), $Ba_nZrO_{2+n}$ (note that, n is $0.99 \leq n \leq 1.01$), and an oxide of R (note that, R is at least one element selected from Sc, Y, La, Ce, Pr, Nd, Pm, Sm, Eu, Gd, Tb, Dy, Ho, Er, Tm, Yb, and Lu). Here, the amount of oxygen (O) can be slightly deviate from the above stoichiometric constitution.

$Ba_mTiO_{2+m}$ posses a strong dielectric property, and it exhibits a high specific permittivity. "m" in the $Ba_mTiO_{2+m}$ is $0.99 \leq m \leq 1.01$. $Ba_mTiO_{2+m}$ is comprised in the dielectric ceramic composition mainly as a base material.

The content of $Ba_nZrO_{2+n}$ (A) as calculated in the conversion of $Ba_nZrO_{2+n}$ is 40 to 65 moles, preferably 40 to 55 moles, and more preferably 40 to 50 moles, with respect to 100 moles of $Ba_mTiO_{2+m}$. Furthermore, "n" in $Ba_nZrO_{2+n}$ is $0.99 \leq n \leq 1.01$. By adding $Ba_nZrO_{2+n}$ in the above range, the capacitance-temperature characteristics and the voltage resistance can be improved. If the content of $Ba_nZrO_{2+n}$ is too little, in addition to the lowering of the capacitance-temperature characteristics and the voltage resistance, the lifetime characteristics tends to deteriorate as well. On the other hand, if it is too much, the specific permittivity tends to decline.

The content of the oxide of R(C) calculated in the conversion of the $R_2O_3$ is 4 to 15 moles, preferably 6 to 12 moles and more preferably 7 to 11 moles with respect to 100 moles of $Ba_mTiO_{2+m}$. The oxide of R posses an effect mainly to suppress the strong dielectric property of $Ba_mTiO_{2+m}$. If the content of the oxide of R is too little, the voltage resistance tends to decline, and also the electrostriction tends to become large when applying the voltage. On the other hand, if it is too much, the specific permittivity tends to decline. Note that, R element constituting oxide of said R is at least one element selected from Sc, Y, La, Ce, Pr, Nd, Pm, Sm, Eu, Gd, Tb, Dy, Ho, Er, Tm, Yb, and Lu; and among these, Gd is particularly preferred.

Furthermore, in the present invention, the ratio of X-ray diffraction maximum intensity between $Ba_mTiO_{2+m}$ and $Ba_nZrO_{2+n}$, and the ratio of the X-ray diffraction maximum intensity between $Ba_mTiO_{2+m}$ and the oxide of R are controlled simultaneously to be in the specific range. Specifically, when the ratio of the X-ray diffraction maximum intensity among peaks of $Ba_nZrO_{2+n}$ with respect to the X-ray diffraction maximum intensity among peaks of $Ba_mTiO_{2+m}$ is B; and the ratio of the X-ray diffraction maximum intensity among peaks of the oxide of R with respect to the X-ray diffraction maximum intensity among peaks of $Ba_mTiO_{2+m}$ is D, then the following equations (1) and (2) are satisfied.

$$0.0038A - 0.147 \leq B \leq 0.0044A + 0.04 \quad \text{Equation (1)}$$

$$0.0041C - 0.0115 \leq D \leq 0.0046C + 0.084 \quad \text{Equation (2)}$$

B is an indication of the degree of solid solution of $Ba_nZrO_{2+n}$ in $Ba_mTiO_{2+m}$, and B becomes larger as the solid insoluble $Ba_nZrO_{2+n}$ increases in the dielectric ceramic composition. Furthermore, D is an indication of the degree of solid solution of $R_2O_3$ in $Ba_mTiO_{2+m}$, and D becomes larger as the solid insoluble $R_2O_3$ increases in the dielectric ceramic composition.

In the present invention, B and D are always larger than 0. That is, it shows that $Ba_nZrO_{2+n}$ and the oxide of R which were solid insoluble in $Ba_mTiO_{2+m}$ exist in the dielectric ceramic composition of the present invention. Due to the existence of $Ba_mTiO_{2+m}$ in which the solid soluble $Ba_nZrO_{2+n}$ and the oxide of R, and the solid insoluble $Ba_nZrO_{2+n}$ and the oxide of R in the dielectric ceramic composition of the present invention, it is possible to improve the high temperature accelerated lifetime while maintaining various characteristics (the specific permittivity, the capacitance-temperature characteristics and such) in a good condition. As for the reason of this, it is speculated because $Ba_nZrO_{2+n}$ and the oxide of R themselves have better high temperature accelerated lifetime than; $Ba_mTiO_{2+m}$ or the oxide of Mg, the oxide of at least one element selected from Mn, Cr, Co and Fe, the oxide of at least one element selected from Si, Li, Al, Ge, and B, and furthermore the compound of these oxide or the composite oxide.

Note that, as it will be explained later on, the above said maximum intensity ratio of (B) and (D) can be controlled by changing the calcination condition of the material and the firing condition.

The dielectric ceramic composition of the present embodiment further preferably comprises the oxide of Mg. The content of the oxide of Mg as calculated in the conversion of MgO is preferably 4 to 12 moles, and more preferably 6 to 10 moles with respect to 100 moles of $Ba_mTiO_{2+m}$. The oxide of Mg has an effect to suppress the strong dielectric property of $Ba_mTiO_{2+m}$. If the content of the oxide of Mg is too little, in addition to the lowering of the capacitance-temperature characteristics and the voltage resistance, the electrostriction tends to become large when applying the voltage. On the other hand, if it is too much, in addition to the decline of the specific permittivity, the lifetime characteristics and the voltage resistance tends to deteriorate.

The dielectric ceramic composition of the present embodiment preferably further comprises an oxide of at least one selected from Mn, Cr, Co, and Fe. These contents as calculated in the conversion of MnO, $Cr_2O_3$, $CO_3O_4$, and $Fe_2O_3$ are preferably 0.5 to 3 moles, and more preferably 0.5 to 2.5 moles with respect to 100 moles of $Ba_mTiO_{2+m}$. If the contents of the oxide are too little, the lifetime characteristic tends to deteriorate. On the other hand, if too much, as well as the specific permittivity declines, the capacitance-temperature characteristic tends to deteriorate.

The dielectric ceramic composition of the present embodiment preferably further comprises an oxide at least one selected from Si, Li, Al, Ge and B. These contents as calculated in conversion of $SiO_2$, $Li_2O$, $Al_2O_3$, $GeO_2$ or $B_2O_3$ are preferably 3 to 9 moles, and more preferably 3 to 5 moles with respect to 100 moles of $Ba_mTiO_{2+m}$. If the content of the oxide are too little, as well as the specific permittivity declines, the lifetime characteristics deteriorates. On the other hand, if too much, the capacitance-temperature characteristic deteriorates. Note that, among said oxide, the oxide of Si is preferably used since the improvement effects of the characteristics are large.

Note that, in the present description, each oxide or the composite oxide constituting each composition is expressed in stoichiometric component. However the oxidation state of each of the oxide or the composite oxide may deviate from the stoichiometric constitution. Note that, said ratio of the each component is calculated by converting from the metal content comprised in the oxide or the composite oxide constituting each component to the oxide or the composite oxide of said stoichiometric constitution.

The thickness of the dielectric layer 2 is not particularly limited, and it can be determined accordingly depending on the use of the multilayer ceramic capacitor 1.

Internal Electrode Layer 3

The conducting material comprised in the internal electrode layer 3 are not particularly limited, however, since the material constituting the dielectric layer 2 has reduction resistance, fairly inexpensive base metals can be used. The base metals to be used as the conducting materials are preferably, Ni or Ni alloy. As for the Ni alloy, the alloy made of Ni and one or more elements selected from Mn, Cr, Co, and Al is preferable, and the content of the Ni in the alloy is preferably 95 wt % or more. Note that, Ni or the Ni alloy may contain 0.1 wt % or less or so of various trace component such as P or so. Furthermore, the internal electrode layer 3 may be formed by using the commercially available electrode paste. The thickness of the internal electrode layer 3 may be determined accordingly depending on the use or so.

External Electrode 4

The conducting material comprised in the external electrode 4 is not particularly limited; however, inexpensive Ni, Cu, or the alloy thereof may be used in the present invention. The thickness of the external electrode layer 4 can be determined accordingly depending on the use or so.

The Production Method of the Multilayer Ceramic Capacity 1

The multilayer ceramic capacitor 1 of the present embodiment is produced by making the green chip by the standard printing method or the sheets method using the paste, followed by firing this to print or transfer the external electrodes. The following will explain the production method in detail.

First, a dielectric material (a dielectric ceramic composition powder) comprised in the dielectric layer paste is prepared, and made into a paste to prepare the dielectric layer paste. The dielectric layer paste may be an organic paste kneaded with dielectric material and the organic vehicle, or it may be a water-based paste.

As for the dielectric materials, the oxide of the above each component, the mixture thereof, or the composite oxide can be used. However, other various compounds which becomes the above oxide or the composite oxide as a result of firing can be used, for example, they can be suitably selected from the carbonate, the oxalate, the nitrate, the hydroxide, or the organic metal composite, etc and then mixed to be used. For example, as for the material of $Ba_mTiO_{2+m}$, $Ba_mTiO_{2+m}$ may be used, or $BaCO_3$ and $TiO_2$ may be used as well. Moreover, as for the material of $Ba_nZrO_{2+n}$, $Ba_nZrO_{2+n}$ may be used, or $BaCO_3$ and $ZrO_2$ may be used as well. The content of the each compound in the dielectric material is determined so that the constitution of the above dielectric ceramic composition after the firing is obtained. The particle size of the dielectric material is normally, average diameter of 0.1 to 1 μm or so before made into paste.

In the present embodiment, as for the material of above each component, among at least a part of the material other than $Ba_mTiO_{2+m}$, the each oxide or the composite oxide, or the compound which becomes the each oxide or the composite oxide after firing may be used as it is; or it may be calcinated to be used as calcined powder. Or, as for the part of the material except for $Ba_nZrO_{2+n}$ and the oxide of R, it may be calcinated together with $Ba_mTiO_{2+m}$. However, if $Ba_nZrO_{2+n}$ and/or the oxide of R are calcinated with $Ba_mTiO_{2+m}$, the effect of the present invention becomes hard to attain, thus the calcination of such combination are not preferred. Also, when calcinating, it is preferably performed at 800 to 1100° C.

The material of $Ba_mTiO_{2+m}$ preferably having an average particle diameter of 0.2 to 1 μm is preferably used. Also, the other materials such as $Ba_nZrO_{2+n}$ having the average particle diameter 0.2 to 1 μm are preferably used. Note that, even when calcinating said materials to make as calcined powder, it is preferable to set the average particle diameter within said range.

The organic vehicle is obtained by dissolving a binder in an organic solvent. The binder used in the organic vehicle is not particularly limited, and may be properly selected from a variety of usual binders such as ethylcellulose and polyvinyl butyral. Also, the organic solvent used is not particularly limited, and may be properly selected from a variety of organic solvents such as terpineol, butyl carbitol, acetone and toluene in accordance with a method used such as a printing method and sheet method.

Also, when using water-based dielectric layer paste, dielectric materials can be kneaded with a water-based vehicle obtained by dissolving an aqueous binder and dispersant, etc., in water. The aqueous binder used for water-based vehicle is not particularly limited, and for example, polyvinyl alcohol, cellulose, aqueous acrylic resin, etc., may be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle.

An external electrode paste may be obtained as with the above-mentioned internal electrode layer paste.

The content of organic vehicle in each of the above-mentioned paste is not particularly limited, and may be usual content, for example, 1 to 5 wt % or so of the binder and to 50 wt % or so of the solvent. Also, in each paste, there may be included additives selected from a variety of dispersants, plasticizer, dielectric, insulators, etc., if needed. The total amounts of these are preferably 10 wt % or less.

When using the printing method, the dielectric layer paste and the internal electrode layer paste are printed on a substrate such as PET to form layers, and after cutting to a predetermined shape, a green chip is obtained by removing from the substrate.

Also, when using the sheet method, a green sheet is formed by using dielectric layer paste, internal electrode layer paste is printed thereon, and then, these are stacked to form a green chip.

Before firing, the green chip is subject to binder removal treatment. The binder removal conditions include temperature rising rate of preferably 5 to 300° C./hour, holding temperature of preferably 180 to 400° C., and temperature holding time of preferably 0.5 to 24 hours. Also, a firing atmosphere is the air or reduced atmosphere.

The atmosphere when firing the green chip can be suitably determined depending on the type of the conducting material in the internal electrode paste. However when using base metal such as Ni or Ni alloy as the conducting material, the oxygen partial pressure of the firing atmosphere is preferably $10^{-14}$ to $10^{-10}$ MPa. If the oxygen partial pressure is below said range, the conducting material of the internal electrode layer may have abnormal sintering which results in a breakage thereof. Also, if the oxygen partial pressure exceeds said range, the internal electrode layer tends to oxidize.

The holding temperature at the firing is preferably 1000 to 1400° C., and more preferably 1100 to 1360° C. If the holding temperature is below said range, the densification becomes insufficient; and if it exceeds said range, the breakage of the electrode due to the abnormal sinter of the internal electrode layer, the deterioration of the capacitance-temperature characteristics due to the dispersion of the constitution material of the internal electrode layer, or a reduction of the dielectric ceramic composition tend to occur.

As for the other firing conditions, the temperature rising rate is preferably 50 to 500° C./hour, and more preferably 200 to 300° C./hour; the temperature holding time is preferably 0.5 to 8 hours, and more preferably 1 to 3 hours; and the cooling rate is preferably 50 to 500° C./hour, and more preferably 200 to 300° C./hour. Also, the firing atmosphere is preferably a reduced atmosphere. As for the atmospheric gas, for example, wet mixed gas of $N_2$ and $H_2$ may be used. In the present embodiment, solid solubility of $Ba_nZrO_{2+n}$ and the oxide of R with respect to $Ba_mTiO_{2+m}$ can be controlled by controlling the firing condition such as the holding temperature and the holding time and etc. For example, if the firing temperature is low, the solid insoluble material generates the peaks in the X-ray diffraction chart since it is difficult to solid solubilize in $Ba_mTiO_{2+m}$, and the maximum intensity ratio between (B) and (D) tends to become large.

After firing in a reducing atmosphere, it is preferable to anneal the capacitor device body. The annealing is a treatment for reoxidizing the dielectric layer and can make IR lifetime significantly longer, so that the reliability is improved.

The oxygen partial pressure in the annealing atmosphere is preferably $10^{-9}$ to $10^{-5}$ MPa. When the oxygen partial pressure is below the above range, it may be difficult to reoxidize the dielectric layer. When it exceeds the above range, the internal electrode layer tends to be further oxidized.

Holding temperature at annealing is preferably 1100° C. or less, particularly preferably 500 to 1100° C. When the holding temperature is below the above range, the dielectric layer may not be sufficiently oxidized, often resulting in lowering IR and shortening IR lifetime. On the other hand, when the holding temperature exceeds the above range, the internal electrode layer is not only oxidized to reduce the capacitance, but also reacts with the dielectric body itself, which may easily cause deteriorated capacitance-temperature characteristics, reduced IR, and reduction in IR lifetime. Note that the annealing may consist of a temperature rising process and temperature falling process. Namely, the temperature holding time may be zero. In this case, the holding temperature is same as the maximum temperature.

Additional annealing conditions include: the temperature holding time of preferably 0 to 20 hours, more preferably 2 to 10 hours; and the cooling rate of preferably 50 to 500° C./hour, more preferably 100 to 300° C./hour. Also, the atmosphere gas at annealing is preferably a wet $N_2$ gas, for example.

In the above-mentioned binder removal treatment, firing and annealing, a wetter, etc., may be used to wet the $N_2$ gas and mixed gas, for example. In this case, the water temperature is preferably 5 to 75° C. or so. Also, the binder removal treatment, firing and annealing may be performed continuously or independently.

Thus obtained capacitor device body is then subject to end surface polishing, for example, by barrel-polishing or sand blasting, and the external electrode paste is pasted thereon, followed by firing, so that the external electrode 4 is formed. If needed, a covering layer may be formed on the surface of the external electrode 4 by plating or so.

Thus produced multilayer ceramic capacitor of the present embodiment is mounted on the printed-circuit board, etc., by soldering, etc., to be used in a variety of electronic devices, etc.

Hereinbefore, an embodiment of the present invention is described, but the present invention is not limited to the above-mentioned embodiments and can be variously modified within the scope of the present invention.

For example, in the above-mentioned embodiment, a multilayer ceramic capacitor is exemplified as an electronic device according to the present invention. However, the electronic device according to the present invention is not limited to the multilayer ceramic capacitor and may be any comprising the dielectric layer having the above composition.

EXAMPLES

Hereinafter, the present invention will be described based on the further detailed examples, but the present invention is not limited to the examples.

Example 1

First, $BaTiO_3$ (m=1.000), $BaZrO_3$ (n=1.000), $MgCO_3$, $Gd_2O_3$, MnO and $SiO_2$ were prepared. A dielectric material was prepared by the following two methods. As for the first method, $BaZrO_3$, $MgCO_3$, $Gd_2O_3$, MnO and $SiO_2$ were mixed, and the obtained mixed powder was calcinated at 1000° C. to prepare the calcined powder having average diameter of 0.2 μm. Then, $BaTiO_3$ was added to the obtained calcined powder, and wet pulverized for 15 hours in a ball mill, followed by drying to obtain a dielectric material having average particle diameter of 0.15 μm.

As for the second method, $BaTiO_3$ and $BaZrO_3$ are mixed in a ball mill, and the obtained mixed powder was calcinated at 1000° C. to obtain the calcined powder having average diameter of 0.2 μm. In this calcined powder, $BaZrO_3$ is completely solid soluble in $BaTiO_3$. Next, $MgCO_3$, $Gd_2O_3$, MnO and $SiO_2$ were added to the obtained calcined powder, and wet pulverized for 15 hours in a ball mill, followed by drying to obtain the dielectric material having average particle diameter of 0.15 μm. Note that, in either method, $MgCO_3$ is included in the dielectric ceramic composition as MgO after the firing.

The added amount of $BaZrO_3$ component (A) with respect to moles of $BaTiO_3$ is shown in Table 1. The added amount of $Gd_2O_3$ component (C) was set to 10 moles with respect to 100 moles of $BaTiO_3$. In samples No. 2 and 7, the dielectric material prepared by above second method was used. That is, $BaZrO_3$ is completely solid solubilized in $BaTiO_3$. In the samples No. 1, 3 to 6, and 8 to 18, the dielectric material prepared by the above first method was used. In Table 1, the added amount of each component is the added amount as calculated in the conversion of the composite oxide or the each oxide with respect to 100 moles of $BaTiO_3$. Note that, with respect to 100 moles of $BaTiO_3$; the added amount of $MgCO_3$ component was 8 moles, the added amount of MnO component was 1.5 moles, and the added amount of $SiO_2$ component was 4.5 moles.

Next, the obtained dielectric material: 100 parts by weight, polyvinyl butyral resin: 10 parts by weight, dioctyl phthalate (DOP) as a plasticizer: 5 parts by weight, and alcohol as a solvent: 100 parts by weight were mixed by a ball mill to form a paste, so that a dielectric layer paste was obtained.

Also, aside from the above, Ni particles: 44.6 parts by weight, terpineol: 52 parts by weight, ethyl cellulose: 3 parts by weight and benzotriazole: 0.4 parts by weight were kneaded by triple rolls to slurry, so that an internal electrode layer paste was obtained.

Then, by using the above-obtained dielectric layer paste, on a PET film, a green sheet was formed so as to have a thickness after drying of 30 μm. Next, by using the internal electrode layer paste, an electrode layer was printed in a predetermined pattern thereon, followed by removing the sheet from the PET film, so that the green sheet having the electrode layer was obtained. A plurality of green sheets having the electrode layer were stacked and adhered by pressure to obtain a green stacking body. The green stacking body was cut in a predetermined size to obtain a green chip.

Then, the obtained green chip was subject to binder removal treatment, firing and annealing in the following conditions, to obtain a multilayer ceramic fired body.

The binder removal treatment was performed at temperature rising rate: 25° C./hour, holding temperature: 260° C., temperature holding time: 8 hours, and atmosphere: in the air.

The firing condition was performed at temperature rising rate: 200° C./hour, holding temperature: 1220 to 1380° C., temperature holding time: 2 hours, cooling rate: 200° C./hour, atmosphere gas: wet mixed gas of $N_2$ and $H_2$ (the oxygen partial pressure: $10^{-12}$ MPa).

The annealing was performed at temperature rising rate: 200° C./hour, holding temperature: 1000 to 1100° C., temperature holding time: 2 hours, cooling rate: 200° C./hour, atmosphere gas: wet gas of $N_2$ (the oxygen partial pressure: $7.5 \times 10^{-8}$ to $2.3 \times 10^{-7}$ MPa).

Note that a wetter was used to wet the atmosphere gas during the firing and annealing.

After polishing end faces of the obtained multilayer ceramic fired body with sandblast, In—Ga was coated as an external electrode to obtain a sample of the multilayer ceramic capacitor shown in FIG. 1. In the present example, as shown in Table 1, the plurality of the capacitor samples (samples No. 1 to 19) were made in which comprising the dielectric layer constituted by the dielectric ceramic composition of different composition. The size of the obtained capacitor sample was 3.2 mm×1.6 mm×0.6 mm, the thickness of the dielectric layer was 20 μm, the thickness of the internal electrode layer was 1.5 μm, and the number of the dielectric layers sandwiched by the internal electrode layers was 10.

The obtained dielectric layer of the multilayer ceramic capacitor was subject to the X-ray diffraction as shown in the following. Furthermore, the specific permittivity (∈s), the capacitance-temperature characteristics (TC), the DC bias characteristics, the high temperature accelerated lifetime (HALT), the breakdown voltage (voltage resistance), and the electrostriction by application of voltage of the obtained each capacitor samples were measured in the method shown in the following.

X-Ray Diffraction

Figure 2:
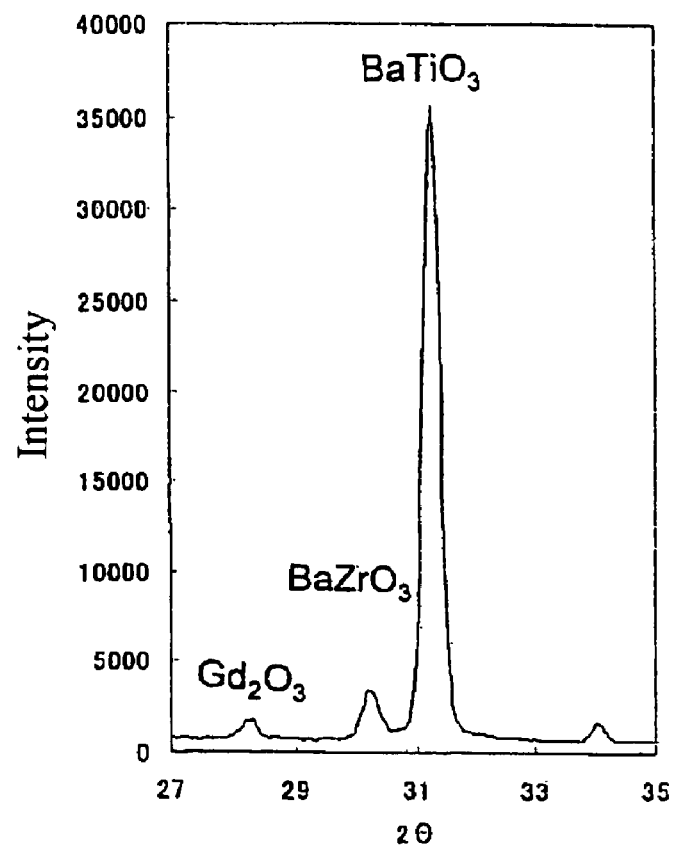
FIG. 2 shows the X-ray diffraction chart of the X-ray diffraction maximum intensity of $BaTiO_3$, $BaZrO_3$ and $Gd_2O_3$.
Figure 3:
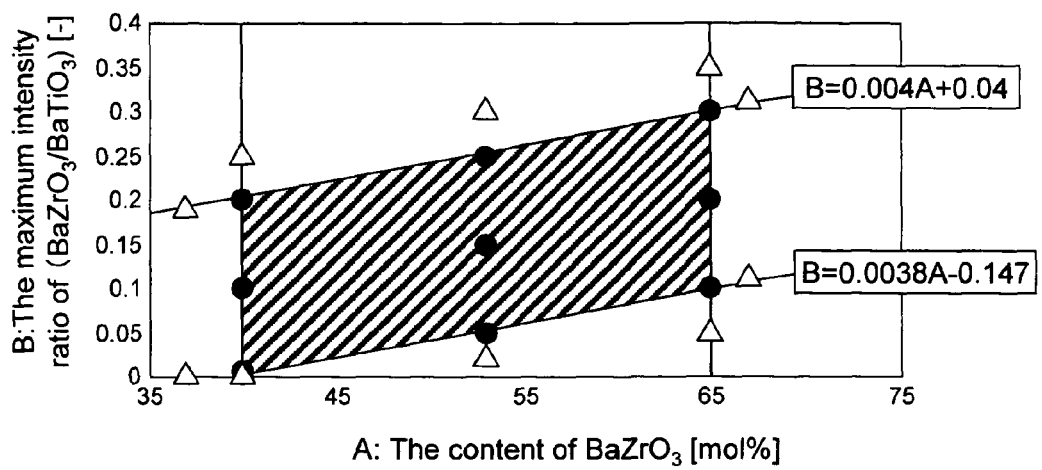
FIG. 3 is a graph showing the relation between the content of $BaZrO_3$ (A) and the ratio of the X-ray diffraction maximum intensity among peaks of $BaZrO_3$ with respect to the X-ray diffraction maximum intensity among peaks of $BaTiO_3$ (B).

Cu-Kα was used as the X-ray source in the X-ray diffraction, and the conditions were; at the voltage 50 kV and the current mA, in the range of 2θ=10° to 80°, at the scanning speed of 1/16 deg/min, and the estimation time of 1 sec. The maximum intensity of $BaTiO_3$, $BaZrO_3$, and $Gd_2O_3$ are identified from the obtained X-ray diffraction chart to determine the ratio (B) of the X-ray diffraction maximum intensity among peaks of $BaZrO_3$ with respect to the X-ray diffraction maximum intensity among peaks of $BaTiO_3$; and the ratio (D) of the X-ray diffraction maximum intensity among peaks of $Gd_2O_3$ with respect to the X-ray diffraction maximum intensity among peaks of $BaTiO_3$. For example, in the X-ray diffraction chart of 2θ=27° to 35° as shown in FIG. 2, the X-ray diffraction maximum intensity of $BaTiO_3$ is taken as 1. Then, the X-ray diffraction maximum intensity of $BaZrO_3$ is 0.08, and the X-ray diffraction maximum intensity of $Gd_2O_3$ is 0.03. That is, B is 0.08 and D is 0.03. The obtained maximum intensity ratio is shown in Table 1. Also, the relation between the content of $BaZrO_3$ (A) and the maximum intensity ratio (B) is shown in the graph of FIG. 3.

Specific Permittivity ∈s

For capacitor samples, by digital LCR meter (4284A by YHP), inputting frequency of 1 kHz and input signal level (measured voltage) of 1 Vrms, capacitance C at 25° C. was measured. Then, specific permittivity es (no unit) was calculated based on the thickness of the dielectric layer, effective electrode area and the capacitance C obtained by the measurement. In the present example, an average of calculated values on 10 capacitor samples was determined as a specific permittivity. The higher specific permittivity is more preferable, and in the present example, 250 or more was considered good.

Capacitance-Temperature Characteristics (TC)

For capacitor samples, by digital LCR meter (4284A by YHP), inputting frequency of 1 kHz and input signal level (measured voltage) of 1 Vrms, capacitance at 125° C. was measured to calculate the changing rate with respect to the capacitance at reference temperature 25° C. In the present example, if it was within the range of ±15%, then it was considered good. The results are shown in Table 1.

DC Bias Characteristics

For capacitor samples, the capacitance changing rate were calculated while applying the direct voltage under electric field of 10 V/μm. In the present invention, it was considered good if it was −10% or more. The results are shown in the Table 1.

High Temperature Accelerated Lifetime (HALT)

For the capacitor samples, the life time was measured while applying the direct voltage under the electric field of 40 V/μm at 200° C., and thereby the high temperature accelerated lifetime (HALT) was evaluated. In the present example, the lifetime was defined as the time from the beginning of the voltage application until the insulation resistance drops by one digit. Also, this high temperature accelerated lifetime evaluation was performed to 10 capacitor samples. In the present example, 20 hours or longer was considered good. The results are shown in Table 1.

Breakdown Voltage (Voltage Resistance)

A direct voltage was applied to the capacitor samples at the voltage rising rate of 100 V/sec at 25° C. The breakdown voltage is the voltage value (unit:V/μm) with respect to the thickness of the dielectric layer when 10 mA of current is applied. By measuring the breakdown voltage, the voltage resistance of the capacitor samples was evaluated. In the present example, the breakdown voltage of 50 V/μm or more was considered good. The results are shown in Table 1.

Electrostriction Due to Applied Voltage

First, capacitor sample was mounted to a glass epoxy board, on which a predetermined pattern of electrode was printed, by soldering. Next, to the capacitor sample mounted on the board, voltage was applied under conditions of AC at 10 Vrms/μm and frequency at 3 kHz to measure amplitude of vibration of the capacitor sample surface when applying voltage, which was determined as electrostriction. Note that amplitude of vibration of the capacitor sample surface was measured by laser Doppler vibrometer. Also, in the present example, an average of measurements of 10 capacitor samples was determined as electrostriction. The lower electrostriction is more preferable, and in the present example, less than 10 ppm was considered good. The results are shown in Table 1.

TABLE 1

| Sample Number | $BaZrO_3$ content [mol] A | Maximum Intensity ratio $BaZrO_3$/$BaTiO_3$ [-] B | $Gd_2O_3$ content [mol] C | Maximum Intensity ratio $Gd_2O_3$/$BaTiO_3$ [-] D | ∈s | TC (125° C.) [%] | DC-Bias [%] | High temperature accelerated life time [h] | Break down voltage [V/μm] | Electrostriction [ppm] |
|---|---|---|---|---|---|---|---|---|---|---|
| *1 | 37 | 0.19 | 10 | 0.08 | 272 | −14 | −7 | 7 | 55 | 7 |
| *2 | 37 | 0 | | | 271 | −14 | −6 | 5 | 57 | 6 |
| *3 | 40 | 0.25 | | | 268 | −14 | −6 | 7 | 58 | 5 |
| 4 | 40 | 0.2 | | | 268 | −14 | −6 | 23 | 56 | 7 |

TABLE 1-continued

| Sample Number | BaZrO$_3$ content [mol] A | Maximum Intensity ratio BaZrO$_3$/BaTiO$_3$ [-] B | Gd$_2$O$_3$ content [mol] C | Maximum Intensity ratio Gd$_2$O$_3$/BaTiO$_3$ [-] D | εs | TC (125° C.) [%] | DC-Bias [%] | High temperature accelerated life time [h] | Break down voltage [V/μm] | Electrostriction [ppm] |
|---|---|---|---|---|---|---|---|---|---|---|
| 5 | 40 | 0.1 | | | 270 | −14 | −6 | 25 | 58 | 6 |
| 6 | 40 | 0.005 | | | 269 | −14 | −5 | 23 | 52 | 5 |
| * 7 | 40 | 0 | | | 266 | −14 | −6 | 10 | 57 | 5 |
| * 8 | 53 | 0.3 | | | 262 | −13 | −6 | 8 | 58 | 6 |
| 9 | 53 | 0.25 | | | 260 | −13 | −5 | 24 | 56 | 5 |
| 10 | 53 | 0.15 | | | 259 | −13 | −5 | 23 | 57 | 7 |
| 11 | 53 | 0.055 | | | 263 | −12 | −5 | 25 | 58 | 6 |
| * 12 | 53 | 0.02 | | | 261 | −13 | −5 | 6 | 58 | 7 |
| * 13 | 65 | 0.35 | | | 254 | −13 | −4 | 8 | 58 | 8 |
| 14 | 65 | 0.3 | | | 255 | −12 | −5 | 24 | 55 | 8 |
| 15 | 65 | 0.2 | | | 257 | −13 | −4 | 23 | 53 | 6 |
| 16 | 65 | 0.1 | | | 254 | −12 | −4 | 23 | 55 | 7 |
| * 17 | 65 | 0.05 | | | 255 | −12 | −4 | 9 | 57 | 7 |
| * 18 | 67 | 0.31 | | | 249 | −11 | −4 | 8 | 55 | 7 |
| * 19 | 67 | 0.11 | | | 252 | −12 | −4 | 8 | 56 | 8 |

* indicates the samples out of the range of the present invention.
0.0038A − 0.147 ≦ B ≦ 0.004A + 0.04 . . . Equation (1)
0.0041C − 0.0115 ≦ D ≦ 0.0046C + 0.084 . . . Equation (2)
With respect to 100 moles of BaTiO$_3$, MgO: 8 moles, MnO: 1.5 moles, SiO$_2$: 4.5 moles From Table 1 and FIG. 3, it can be confirmed that by making the content of BaZrO$_3$ (A) and the content of Gd$_2$O$_3$ (C) within the predetermined range of the present invention; and when the ratio (B) of the X-ray diffraction maximum intensity among peaks of BaZrO$_3$ with respect to the X-ray diffraction maximum intensity among peaks of BaTiO$_3$, and the ratio (D) of the X-ray diffraction maximum intensity among peaks of Gd$_2$O$_3$ with respect to the X-ray diffraction maximum intensity among peaks of BaTiO$_3$ satisfy equations (1) and (2) at the same time, then the high temperature accelerated lifetime (HALT) can be improved while the specific permittivity (∈s), the capacitance-temperature characteristics (TC), the DC bias characteristics, the breakdown voltage, and the electrostriction are maintained in a good condition.

On the contrary, when any one of (A) to (D) is out of the range of the present invention, the high temperature accelerated lifetime deteriorated. For example, in the samples No. 2 and 7, BaZrO$_3$ is completely solid solubilized in BaTiO$_3$, resulting to have no solid insoluble BaZrO$_3$, B becomes 0, and thus the high temperature accelerated lifetime is deteriorated. Note that, in FIG. 3, the range of the present invention is shown in the diagonal line, and the examples and the comparative examples of Table 1 are shown in black circle and white triangle respectively.

Example 2

The constitutions of the dielectric layer are the same as sample No. 10 except for making the content of Gd$_2$O$_3$ (C) to the amount shown in Table 2. In samples No. 20, 22 to 25, 27 to 37, the dielectric material prepared by the above described first method was used.

Figure 4:
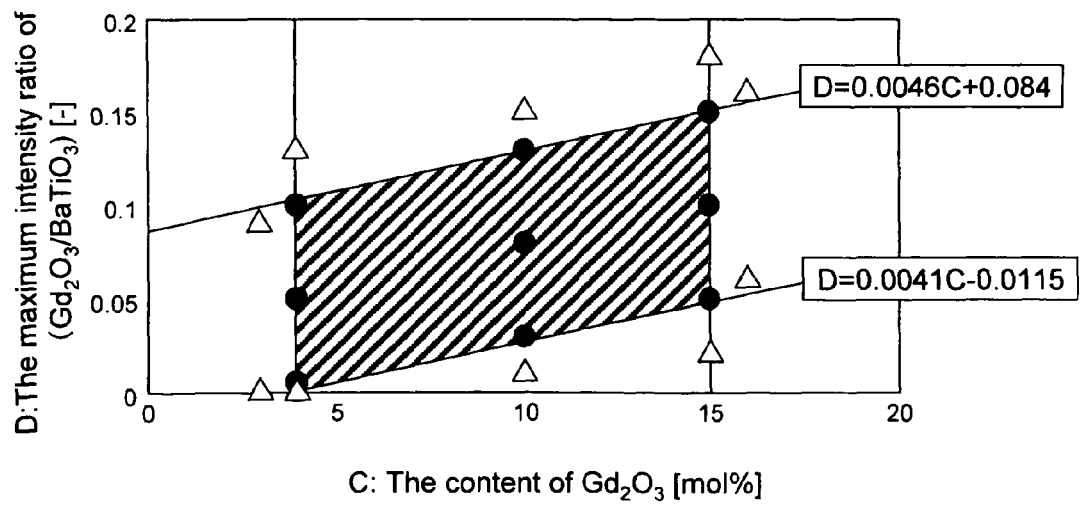
FIG. 4 is a graph showing the relation between the content of $Gd_2O_3$ (C) and the ratio of the X-ray diffraction maximum intensity among peaks of $Gd_2O_3$ with respect to the X-ray diffraction maximum intensity among peaks of $BaTiO_3$ (D).

Also, in samples No. 21 and 26, the dielectric material prepared by the following third method was used. As for the third method, BaTiO$_3$ and Gd$_2$O$_3$ were mixed in a ball mill, and the obtained mixed powder is calcinated at 1000° C. to prepare the calcined powder having average particle diameter of 0.2 μm. That is, Gd$_2$O$_3$ is completely solid solubilized in BaTiO$_3$. Next, BaZrO$_3$, MgCO$_3$, MnO and SiO$_2$ were added to the obtained calcined powder, and wet pulverized for 15 hours in a ball mill, followed by drying to obtain a dielectric material. The multilayer capacitor was produced from the obtained dielectric material as same as the example 1, and the same evaluations as example 1 were performed. The results are shown in Table 2. Also, the relation between the content (C) and the maximum intensity ratio (D) of Gd$_2$O$_3$ are shown in the graph of FIG. 4.

TABLE 2

| Sample Number | BaZrO$_3$ content [mol] A | Maximum Intensity ratio BaZrO$_3$/BaTiO$_3$ [-] B | Gd$_2$O$_3$ content [mol] C | Maximum Intensity ratio Gd$_2$O$_3$/BaTiO$_3$ [-] D | εs | TC (125° C.) [%] | DC-Bias [%] | High temperature accelerated life time [h] | Break down voltage [V/μm] | Electrostriction [ppm] |
|---|---|---|---|---|---|---|---|---|---|---|
| * 20 | 53 | 0.15 | 3 | 0.09 | 271 | −13 | −8 | 6 | 58 | 8 |
| * 21 | | | 3 | 0 | 274 | −13 | −8 | 9 | 58 | 6 |
| * 22 | | | 4 | 0.13 | 273 | −13 | −7 | 7 | 56 | 7 |
| 23 | | | 4 | 0.1 | 268 | −13 | −7 | 23 | 55 | 7 |
| 24 | | | 4 | 0.05 | 266 | −12 | −6 | 23 | 54 | 7 |

TABLE 2-continued

| Sample Number | BaZrO$_3$ content [mol] A | Maximum Intensity ratio BaZrO$_3$/ BaTiO$_3$ [-] B | Gd$_2$O$_3$ content [mol] C | Maximum Intensity ratio Gd$_2$O$_3$/ BaTiO$_3$ [-] D | $\epsilon s$ | TC (125° C.) [%] | DC-Bias [%] | High temperature accelerated life time [h] | Break down voltage [V/μm] | Electrostriction [ppm] |
|---|---|---|---|---|---|---|---|---|---|---|
| 25 | | 4 | | 0.005 | 268 | −12 | −7 | 24 | 55 | 7 |
| *26 | | 4 | | 0 | 265 | −12 | −6 | 11 | 53 | 5 |
| *27 | | 10 | | 0.15 | 257 | −12 | −5 | 12 | 56 | 6 |
| 28 | | 10 | | 0.13 | 259 | −12 | −6 | 24 | 58 | 6 |
| 10 | | 10 | | 0.08 | 259 | −13 | −5 | 23 | 57 | 7 |
| 29 | | 10 | | 0.03 | 261 | −12 | −5 | 24 | 55 | 7 |
| *30 | | 10 | | 0.01 | 262 | −12 | −5 | 13 | 57 | 8 |
| *31 | | 15 | | 0.18 | 257 | −11 | −5 | 15 | 58 | 7 |
| 32 | | 15 | | 0.15 | 255 | −11 | −6 | 25 | 58 | 7 |
| 33 | | 15 | | 0.1 | 256 | −11 | −4 | 25 | 56 | 6 |
| 34 | | 15 | | 0.05 | 252 | −11 | −4 | 26 | 54 | 5 |
| *35 | | 15 | | 0.02 | 254 | −10 | −4 | 15 | 53 | 6 |
| *36 | | 16 | | 0.16 | 251 | −10 | −3 | 16 | 55 | 6 |
| *37 | | 16 | | 0.06 | 250 | −10 | −3 | 15 | 57 | 6 |

* indicates the samples out of the range of the present invention.
0.0038A − 0.147 ≦ B ≦ 0.004A + 0.04 ... Equation (1)
0.0041C − 0.0115 ≦ D ≦ 0.0046C + 0.084 ... Equation (2)
With respect to 100 moles of BaTiO$_3$, MgO: 8 moles, MnO: 1.5 moles, SiO$_2$: 4.5 moles From Table 2 and FIG. 4, it can be confirmed that by making the content of BaZrO$_3$ (A) and the content of Gd$_2$O$_3$ (C) within the predetermined range of the present invention; and when the ratio (B) of the X-ray diffraction maximum intensity among peaks of BaZrO$_3$ with respect to the X-ray diffraction maximum intensity among peaks of BaTiO$_3$, and the ratio (D) of the X-ray diffraction maximum intensity among peaks of Gd$_2$O$_3$ with respect to the X-ray diffraction maximum intensity among peaks of BaTiO$_3$ satisfy equations (1) and (2) at the same time, then the high temperature accelerated lifetime (HALT) can be improved, while the specific permittivity (ES), the capacitance-temperature characteristics (TC), the DC bias characteristics, the breakdown voltage, and the electrostriction are maintained in a good condition.

On the contrary, when any one of (A) to (D) is out of the range of the present invention, the high temperature accelerated lifetime deteriorated. For example, as similar to the example 1, in the samples No. 21 and 26, D becomes 0, and thus the high temperature accelerated lifetime is deteriorated. Note that in FIG. 4, the range of the present invention is shown in the diagonal line, and the examples and the comparative examples of Table 2 are shown in black circle and white triangle respectively.

What is claimed:
1. A dielectric ceramic composition comprising
Ba$_m$TiO$_{2+m}$, where m is 0.99≦m≦1.01,
Ba$_n$ZrO$_{2+n}$, where n is 0.99≦n≦1.01, and
an oxide of R, where R is at least one element selected from the group consisting of Sc, Y, La, Ce, Pr, Nd, Pm, Sm, Eu, Gd, Tb, Dy, Ho, Er, Tm, Yb, and Lu; wherein
when A is a content of said Ba$_n$ZrO$_{2+n}$ with respect to 100 moles of said Ba$_m$TiO$_{2+m}$, and C is a content of the oxide of said R, said A is 40≦A≦65 moles as calculated in conversion of Ba$_n$ZrO$_{2+n}$, said C is 4≦C≦15 moles as calculated in conversion of R$_2$O$_3$; and the following equations (1) and (2) are satisfied:

$$0.0038A - 0.147 \leq B \leq 0.004A + 0.04 \quad \text{Equation (1)}$$

where B is a ratio of the X-ray diffraction maximum intensity among peaks of said Ba$_n$ZrO$_{2+n}$ with respect to the X-ray diffraction maximum intensity among peaks of said Ba$_m$TiO$_{2+m}$; and $$0.0041C - 0.0115 \leq D \leq 0.0046C + 0.084 \quad \text{Equation (2)}$$

where D is a ratio of the X-ray diffraction maximum intensity among peaks of the oxide of said R with respect to the X-ray diffraction maximum intensity among peaks of said Ba$_m$TiO$_{2+m}$.

2. The dielectric ceramic composition as set forth in claim 1 further comprising:
an oxide of Mg;
an oxide of at least one selected from the group consisting of Mn, Cr, Co, and Fe; and
an oxide of at least one selected from the group consisting of Si, Li, Al, Ge and B; wherein
ratios with respect to 100 moles of Ba$_m$TiO$_{2+m}$ calculated in the conversion of the oxide or the composite oxide of each component are:
the oxide of Mg: 4 to 12 moles,
the oxide of Mn, Cr, Co, and Fe: 0.5 to 3 moles, and
the oxide of Si, Li, Al, Ge and B: 3 to 9 moles.

3. An electronic device comprising a dielectric layer comprised of dielectric ceramic composition as set forth in claim 1 and an internal electrode layer.

4. An electronic device comprising a dielectric layer comprised of said dielectric ceramic composition as set forth in claim 2 and an internal electrode layer.

* * * * *